(12) United States Patent
Kabalnov et al.

(10) Patent No.: US 8,052,268 B2
(45) Date of Patent: Nov. 8, 2011

(54) INK SET AND METHOD FOR MAKING THE SAME

(75) Inventors: Alexey S. Kabalnov, San Diego, CA (US); Tadashi Yoshida, San Diego, CA (US); Stephen W. Bauer, San Diego, CA (US); Zeying Ma, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 11/689,026

(22) Filed: Mar. 21, 2007

(65) Prior Publication Data

US 2008/0231873 A1 Sep. 25, 2008

(51) Int. Cl.
*G01D 11/00* (2006.01)
(52) U.S. Cl. ............ 347/100; 347/95; 523/160
(58) Field of Classification Search .......... 358/1.9; 347/100, 101, 95, 96, 88, 99; 106/31.6, 31.13, 106/31.27; 523/160, 161
See application file for complete search history.

(56) References Cited

U.S. PATENT DOCUMENTS

| | | | |
|---|---|---|---|
| 5,625,397 A | 4/1997 | Allred et al. | |
| 5,990,227 A * | 11/1999 | Takizawa et al. | 524/517 |
| 6,767,090 B2 * | 7/2004 | Yatake et al. | 347/100 |
| 6,846,353 B2 | 1/2005 | Sano et al. | |
| 6,924,327 B2 | 8/2005 | Sano et al. | |
| 7,169,218 B2 * | 1/2007 | Pallen et al. | 106/31.27 |
| 2003/0226473 A1 | 12/2003 | Ishimoto | |
| 2004/0100542 A1 * | 5/2004 | Chen et al. | 347/95 |
| 2004/0216638 A1 * | 11/2004 | Rolly | 347/100 |
| 2004/0250726 A1 * | 12/2004 | Mott et al. | 106/31.6 |
| 2005/0087099 A1 * | 4/2005 | Blease et al. | 106/31.27 |
| 2005/0171239 A1 * | 8/2005 | Bauer et al. | 523/160 |
| 2006/0181587 A1 * | 8/2006 | Bauer et al. | 347/100 |
| 2006/0203061 A1 | 9/2006 | Ichinose et al. | |

FOREIGN PATENT DOCUMENTS

| | | |
|---|---|---|
| EP | 1 559 755 A1 | 8/2005 |
| EP | 1 589 081 A1 | 10/2005 |
| JP | 09157564 A * | 6/1997 |
| KR | 10-1999-0037410 A | 5/1999 |

* cited by examiner

*Primary Examiner* — Manish S Shah

(57) ABSTRACT

An ink set includes a light gray ink, a medium gray ink, and a black ink. Each of the inks in the ink set includes a carboxylic polymer. The light gray ink has a carboxylic polymer load equal to or greater than about 4.27 wt %. The medium gray ink has a carboxylic polymer load ranging from about 2.47 wt % to about 3.47 wt %. The black ink has a carboxylic polymer load ranging from about 0.5 wt % to about 2 wt %.

20 Claims, No Drawings

INK SET AND METHOD FOR MAKING THE SAME

BACKGROUND

The present disclosure relates generally to an ink set and a method for making the same.

An ink set may be used as an ink source for an inkjet printing system to produce images on a print substrate or media. Ink sets generally include two or more inks, each of which has a different color, or a different shade of the same color. Ink sets having a variety of different colored inks are often used to produce colored images. Ink sets including different shades of gray and/or black inks are often used to produce high quality black-and-white images or to improve color balance of color images. For example, an ink set may be a three ink set including a light gray ink, a medium gray ink, and a black ink. Two or more of the inks of this type of ink set may be combined together to form other shades of gray.

Production of relatively high quality black-and-white images on a print surface generally requires that the individual inks have suitable physical properties including desirable levels of neutrality, metamerism, grain control, bronzing, dynamic range, permanence, durability (e.g., waterfastness (stability to water drip) and smudgefastness (stability to smudge/abrasion)), gloss uniformity, and the like.

Several methods have been used to optimize these ink performance properties for pigmented ink systems. One example of such a method includes the addition of a gloss enhancer to the ink set to reduce bronzing and improve gloss. The gloss enhancer is printed in conjunction with the other colors to improve their gloss and bronzing performance. This method, however, requires the addition of another ink to the ink set.

Another example of such a method includes using significant amounts of cyan ink, magenta ink, and yellow ink (commonly referred to as composite black) along with, or in substitution of gray ink to reduce bronzing of the gray ink and to obtain neutrality and gloss uniformity. This method may involve the potential drawback of adding metamerism, and may involve neutrality issues.

In another example, black and gray inks may include cyan and magenta or cyan and violet colorants as shading agents (black colorants, in particular, those based on carbon black, tend to exhibit a brownish color when printed) to form a more spectrally flat gray color. Bronzing may still be a problem for images printed with this system.

In still another effort to reduce bronzing and obtain neutrality, only opaque inks (e.g., black ink, dark cyan ink, dark magenta ink, etc.) are used. Opaque inks, unlike transparent inks (e.g., gray ink, light cyan ink, light magenta ink, etc.), tend to have limited bronzing effect because they substantially eliminate reflection off of the print media.

DETAILED DESCRIPTION

Embodiment(s) of the ink set and the method(s) for making the ink set as disclosed herein advantageously include at least one shade of gray ink (e.g., a light gray ink, a medium gray ink, or the like) and a black ink that are relatively neutral and exhibit enhanced gloss uniformity. These performance properties are achieved without having to deposit other colored inks (e.g., cyan, magenta, and/or yellow inks) along with the gray and black inks established on the substrate, and without having to use a gloss enhancer. The individual inks also advantageously include pigment-based colorants.

The carboxylic polymers used in embodiments of the ink composition disclosed herein advantageously enable control over the thickness of the ink film established on a medium. It is believed that controlling the thickness with carboxylic polymers advantageously enables enhanced gloss uniformity by minimizing constructive and destructive interferences caused by light reflected from the interfaces between the ink dot and air, and the internal side of the ink dot and the media, respectively.

As used herein, the term "gloss level" refers to the amount of gloss that an ink exhibits when established on a substrate. The gloss level is measured by a gloss meter (such as, for example, those manufactured by BYK-Gardner). The term "gloss uniformity," as used herein, refers to a substantially uniform distribution of gloss level of the final printing output when the inks are established adjacent to each other on a surface of the substrate. It is to be understood that the gloss levels of the individual printed inks may vary with respect to each other while, at the same time, gloss uniformity of the printed image is achieved. This may result, for example, when ink dots with varying degrees of glossiness are printed together to create an image. In such an embodiment, averaging the glossiness of the dots may smooth the gloss uniformity.

Also as used herein, the singular forms of the articles "a," "an," and "the" include plural references unless the content clearly indicates otherwise.

An embodiment of the inkjet ink set, as disclosed herein, includes a light gray ink, a medium gray ink, and a black ink. Another embodiment of the ink set includes a light gray, a light cyan, and/or a light magenta ink in combination with one or more other inks (e.g., black, colored, or combinations thereof). Without being bound to any theory, it is believed that improved gloss uniformity and decreased bronzing may be achieved, in part, because of the combination of carboxylic polymers and selected solvents in one or more of the individual ink formulations. The carboxylic groups of the carboxylic polymers are advantageously responsive to the pH of the substrate. It is believed that such a reaction contributes to achieving desirable gloss uniformity of the inks when the inks are established on the substrate.

In one embodiment, the light gray ink, the medium gray ink, and the black ink each include a pigment and a carboxylic polymer dispersed in an ink vehicle. In another embodiment, the light gray ink, light cyan ink, and/or light magenta ink include the pigment and carboxylic polymer dispersed in the ink vehicle. In some embodiments, the one or more of the inks include one or more pigments, one or more carboxylic polymers, and the ink vehicle. As used herein, the term "ink vehicle" refers to the vehicle in which the pigment(s) is/are placed to form an ink. A wide variety of ink vehicles may be used with the inks, ink sets, systems, and methods according to the embodiment(s) disclosed herein. It is to be understood that the inks in the ink set may be aqueous-based inks, organic-based inks, or combinations thereof. Non-limiting examples of suitable ink vehicle components include carboxylic polymers, binders, surfactants, solvents, buffers, biocides, sequestering agents, viscosity modifiers, chelating agents, and/or water, and/or combinations thereof.

The ink vehicle for the inks disclosed herein includes one or more solvents, one or more surfactants, and water. Without being bound to any theory, it is believed that the solvent(s) is/are used to smooth the ink pigment when the ink layer is established on the substrate. Since the solvent(s) is/are absorbed into the substrate, and generally do not sit on the substrate surface, it is believed that the solvent(s) may indirectly affect gloss uniformity of the inks. It is also believed that hydrophobic solvents tend to produce smoother surfaces and tend to exhibit higher gloss than hydrophilic solvents.

In an embodiment, the ink vehicles include one or more solvents selected from glycerol polyoxyethyl ether (LEG-1), diethylene glycol, 2-pyrrolidone, glycerol, 1,2-hexanediol, and/or combinations thereof. In a non-limiting example, the solvent(s) are present in the light gray ink, the light cyan ink, the light magenta ink, the medium gray ink, and/or the black ink in an amount ranging from about 15 wt % to about 30 wt %. In another embodiment, the solvent(s) are present in the light gray, cyan, and/or magenta inks and the medium gray ink in an amount ranging from about 15 wt % to about 30 wt %, and the solvent(s) are present in the black ink in an amount ranging from about 15 wt % to about 20 wt %.

Surfactants are included in the ink compositions to assist in controlling the physical properties of the ink, such as jetting stability, waterproofness and bleeding. One or more surfactants may be used in the ink formulations. It is to be understood that in any of the ink compositions disclosed herein, the surfactant(s) may be present in an amount ranging from about 0.1 wt % to about 2 wt %. In one embodiment, the amount of surfactant(s) present in the light gray, cyan, and/or magenta inks and the medium gray ink ranges from about 0.35 wt % to about 0.45 wt %, and the amount of surfactant(s) present in the black ink ranges from about 0.65 wt % to about 0.75 wt %.

The surfactant(s) used for embodiment(s) of the light gray cyan, and/or magenta inks, the medium gray ink, and the black ink are nonionic or anionic, and are generally water-soluble organic ether(s) or alcohol(s). Several commercially available nonionic surfactants may suitably be used in the formulation of the ink, examples of which include ethoxylated alcohols such as those from the Tergitol® series (e.g., Tergitol® 15S5,Tergitol® 15S7,Tergitol® 15S9) manufactured by Union Carbide, located in Houston, Tex.; surfactants from the Surfynol® series (e.g. Surfynol® 440 and Surfynol® 465) manufactured by Air Products and Chemicals, Inc., located in Allentown, Pa.; fluorinated surfactants, such as those from the Zonyl® family (e.g., Zonyl® FSO and Zonyl® FSN surfactants) manufactured by E.I. duPont de Nemours and Company, located in Wilmington, Del.; fluorinated PolyFox® nonionic surfactants (e.g., PG-154 nonionic surfactants) manufactured by Omnova, located in Fairlawn, Ohio; 2-diglycol surfactants, such as 1,2 hexanediol or 1,2-octanediol; or combinations thereof.

Suitable anionic surfactant(s) that may be used in the ink compositions include surfactants of the Dowfax® family (e.g., Dowfax® 8390) manufactured by Dow Chemical Company, located in Midland, Mich.; anionic Zonyl® surfactants (e.g., Zonyl® FSA) manufactured by E.I. duPont de Nemours and Company; or combinations thereof.

Additives may also be incorporated into embodiment(s) of the ink formulations. As used herein, the term "additives" refers to constituents of the ink that operate to enhance performance, environmental effects, aesthetic effects, or other similar properties of the ink. Examples of additives include buffers, biocides, sequestering agents, chelating agents, or the like, or combinations thereof. As a non-limiting example, a bactericide, such as Proxel® GXL, may be added to the ink to protect the ink from bacterial growth. In an embodiment, the amount of additive(s) present in the light gray ink, the medium gray ink, and the black ink ranges from about 0.1 wt % to about 0.2 wt %. In another embodiment, no additives are present in one or more of the three inks.

In an embodiment, the inks also include water as a balance. Generally, the amount of water is present in an amount ranging from about 60 wt % to about 80 wt %.

The addition of polymeric binders to ink compositions may be particularly beneficial for stabilizing the ink composition, and for achieving improved water and rub resistance, relatively good durability, relatively good gloss and low bronzing of the ink on the substrate. In the embodiments disclosed herein, carboxylic polymers are present in one or more of the light gray ink, the light cyan ink, the light magenta ink, the medium gray ink, and the black ink to also effectively improve gloss uniformity. In some embodiments of the ink set, the light ink(s) includes the carboxylic polymers, and in other embodiments of the ink set, all of the inks include the carboxylic polymers.

Desirable polymers include those that tend to precipitate on the surface of the substrate. Polymers having one or more carboxylic groups that will react with the substrate (which has a relatively low pH) are desirable for the inks disclosed herein. In an embodiment, the polymers including at least one carboxylic group (i.e., a carboxylic polymer) have a molecular weight ranging from about 1000 to about 20,000 g/mol, and an acid number ranging from about 50 to about 200. As previously described, it is believed that the carboxylic polymers advantageously enable one to control the thickness of the printed ink film, which is believed to contribute to uniform gloss.

Non-limiting examples of suitable carboxylic polymers include styrene-acrylic copolymers, salts of styrene-acrylic acid copolymers, hydrolyzed co-polymers of styrene and maleic acid anhydride, acrylic polymers, and/or combinations thereof.

As a non-limiting example, one class of polymeric binders suitable for use in the inks includes salts of styrene-acrylic acid copolymers. A salt of a styrene-acrylic acid copolymer includes at least a styrene skeleton and a skeleton of the salt of the styrene-acrylic acid copolymer in its structure. It may also contain a skeleton derived from a monomer having another unsaturated group, such as an acrylate skeleton, in its structure. Suitable non-limiting examples of styrene-acrylic acid copolymers are commercially available and may be selected from the Joncryl® series (e.g., Joncryl® 586 and 683) manufactured by BASF, Corp., located in Florham Park, N.J.; SMA-1000Na and SMA-1440K manufactured by Sartomer, located in Exton, Pa.; Disperbyk 190 manufactured by BYK Chemicals, located in Wallingford, Conn.; polystyrene-acrylic polymers manufactured by Gifu Shellac, located in Japan; or combinations thereof.

In an embodiment, the light gray ink, the light magenta ink, and/or the light cyan ink has a carboxylic polymer load equal to or greater than about 3 wt %. The medium gray ink has a carboxylic polymer load ranging from about 1 wt % to about 3 wt %. The black ink has a carboxylic polymer load ranging from about 0.5 wt % to about 2 wt %. In another embodiment, the carboxylic polymer load of the light gray ink ranges from about 3 wt % to about 5 wt %, the carboxylic polymer load of the medium gray ink ranges from about 2 wt % to about 4 wt %, and the carboxylic polymer load of the black ink ranges from about 1 wt % to about 2 wt %. In still another embodiment, the carboxylic polymer load of the light gray ink is about 5 wt %, the carboxylic polymer load of the medium gray ink is about 3 wt %, and the carboxylic polymer load of the black ink is about 1 wt %.

The gray inks as disclosed herein may generally be classified in levels of lightness, wherein one level of gray ink, for example, is a light gray ink, and another level of gray ink is a medium gray ink. Each level of gray ink includes a combination of different colorants. It is to be understood that the colorants used for the several levels of gray ink are pigments. As used herein, the term "pigment" refers to a colorant particle that is substantially insoluble in the ink vehicle in which it is used. Suitable pigments for the light gray, cyan, and/or magenta, and medium gray inks include self-dispersed pigments and non-self-dispersed pigments. Self-dispersed pigments include those that have been chemically modified at the surface with a charge or a polymeric grouping. This chemical modification aids the pigment in becoming and/or substantially remaining dispersed in a liquid. A non-self-dispersed pigment utilizes a separate and unattached dispersing agent (e.g., polymers) in the ink vehicle, or a polymeric shell physically coated (encapsulated) on the surface of the pigment.

The different levels of gray are achieved by varying the amounts of one or more pigments. As a non-limiting example, the amounts of at least two different colored pigments and a black pigment are varied to achieve different gray levels. In an embodiment, the light gray ink and the medium gray ink are formed using the combination of cyan pigment, violet pigment, and black pigment. In another embodiment, the light gray ink and the medium gray ink are formed using the combination of cyan pigment, black pigment, and magenta pigment. In still other embodiments, the light and medium gray inks are formed using a combination of cyan and black pigments, or a combination of blue and black pigments. The light and medium gray inks may also be formulated with black pigment, without the addition of other colored pigments. As previously stated, the amounts of the pigments are varied in order to achieve a desirable shade of gray.

The light cyan and magenta inks disclosed herein generally include cyan pigments and magenta pigments, respectively.

Suitable pigments for the cyan and/or blue pigments include, but are not limited to, pigment blue 1,pigment blue 2,pigment blue 3,pigment blue 15:3, pigment blue 16,pigment blue 22,vat blue 4,vat blue 6,and/or the like, and/or combinations thereof.

Suitable pigments for the black pigment include, but are not limited to, water dispersible sulfur pigments such as Solubilized Sulfur Black 1,materials such as carbon black, non-limiting examples of which include FW18,FW2,FW200 (all manufactured by Degussa Inc., located in Dusseldorf, Germany); Monarch 700, Monarch 800,Monarch 1000,Monarch 880,Monarch 1300,Monarch 1400,Regal 400R, Regal 330R, Regal 660R (all manufactured by Cabot Corporation, located in Boston, Mass.); Raven 5750,Raven 250,Raven 5000, Raven 3500,Raven 1255, Raven 700 (all manufactured by Columbian Chemicals, Co., located in Marietta, Ga.), or derivatives of carbon black, and/or combinations thereof.

Suitable pigments for the violet and/or blue pigments include, but are not limited to, pigment violet 23,pigment violet 37,pigment violet 42,pigment violet 3, pigment violet 32,pigment violet 36,pigment violet 38,and/or combinations thereof.

Suitable pigments for the magenta pigment include, but are not limited to, PR122,PR192,PR202,PR206,PR207,PR209, PR43,PR194,PR112,PR123, PR168,PR184,PR5,PR7,PR12, PR48,PR57,PR57:1,pigment violet 19,and/or combinations thereof.

The black ink as disclosed herein is a photo black ink, which generally includes small pigment particles to achieve a high gloss level. Photo black inks typically have a maximum optical density of more than 2.0 and have relatively good smudge resistance on glossy media. Examples of pigments suitable for the photo black inks include the cyan, violet and black pigments that are suitable for forming the gray inks.

It is to be understood that although the light gray, the medium gray, and the black inks may all, in some embodiments, include the same combination of pigments (e.g., cyan, black and violet or cyan, black and magenta etc.), the pigment loadings for each colorant differs substantially for each of the individual inks. For example, the black ink includes black, cyan and violet pigment loadings that are substantially larger than the respective pigment loadings for the medium gray ink and for the light gray ink. In another example, the light gray ink includes smaller black, cyan, and violet pigment loadings, respectively, than the pigment loadings that are present in the medium gray ink.

As such, it follows that the total pigment loading suitable for forming one level of gray ink (e.g., light gray ink) is significantly different from the total pigment loading for forming another level of gray ink (e.g., medium gray ink). Likewise, the black ink includes a total pigment loading that is significantly different from the total pigment loadings for either the light gray or medium gray inks. In a non-limiting example, the ratio of total pigment or colorant loading of the light gray ink to the black ink ranges from about 1:16 to about 1:2. In another non-limiting example, the ratio of total pigment or colorant loading of the medium gray ink to the light gray ink ranges from about 1.5:1 to about 4:1,and the ratio of colorant loading of the black ink to the medium gray ink ranges from about 2:1 to about 4:1.

Another embodiment of the ink set includes the light gray, light magenta, and/or light cyan ink as disclosed hereinabove (including the ink vehicle, pigment(s), and carboxylic polymer(s) in an amount equal to or greater than 3 wt %), and another black and/or colored ink that may not include the carboxylic polymer(s). The other ink(s) may be pure carbon black ink, dark magenta ink, dark cyan ink, medium gray ink, yellow ink, any of the other inks disclosed herein, or any other suitable colored ink. It is to be understood that the other ink(s) may have any vehicle that is compatible with the light gray, cyan, and/or magenta ink disclosed herein. A non-limiting example of such an ink set includes the light cyan and magenta inks disclosed herein in combination with a pure carbon black ink and a yellow ink.

One embodiment of the inkjet ink set as disclosed herein is made by forming the light gray ink, the medium gray ink, and the black ink, each of which includes the ink vehicle and at least one pigment; and adding a different amount of carboxylic polymer to each of the ink vehicles so that the light gray ink has a higher carboxylic polymer load than the medium gray ink, and the medium gray ink has a higher carboxylic polymer load than the black ink. Another embodiment of the inkjet ink set as disclosed herein is made by forming the light gray ink, the light cyan ink and/or the light magenta ink, each of which includes the ink vehicle and at least one pigment; and adding about 3 wt % or more of the carboxylic polymer to the respective ink vehicle.

Once the inks have been formed, the inks may then be placed into a single ink cartridge or pen (having individual chambers) or into respective ink cartridges or pens to complete the ink set. In a non-limiting example, the ink set may include three ink cartridges, wherein the light gray ink is placed in a first ink cartridge, the medium gray ink is placed in a second ink cartridge, and the black ink is placed in a third ink cartridge. The ink cartridges may be provided in a variety of configurations including single pens or cartridges, dual chamber cartridges, tri-chamber cartridges, or other known configurations.

In use, the inkjet ink set may be placed or otherwise disposed in a printer, and the ink(s) may be established on a portion of or on the entire surface of a substrate. Examples of suitable substrate materials include, but are not limited to plain papers, microporous photopapers, coated papers, glossy photopapers, semi-gloss photopapers, heavy weight matte papers, billboard papers, vinyl papers, or the like. While a number of substrates are suitable, it is believed that the embodiments of the ink set disclosed herein exhibit substantially improved gloss uniformity and bronzing control when printed on microporous glossy and semi-gloss media with high acidity, such as HP Advanced Photo Paper (glossy or semi-gloss).

The inks may be established simultaneously or sequentially using inkjet printing techniques. Non-limiting examples of suitable inkjet printing techniques include piezo-electric inkjet printing, thermal inkjet printing, continuous inkjet printing, and/or combinations thereof. The type and amount of ink established depends, at least in part, on the size, shape, and/or configuration, and the desirable color of the image to be formed. In an embodiment, the images produced by the inks of the ink set include alphanumeric indicia, graphical indicia, or combinations thereof.

In order to create a substantially continuous tonal transition in the black-and-white output, in one embodiment the light gray, medium gray and black inks (all of which include the carboxylic polymer(s)) may be printed in a predetermined sequential pattern. For reproduction of highlights, light gray inks are used. As the optical density of the image increases, medium gray inks are blended in. For even darker tones, the black ink is used instead of the light gray ink, either by itself, or in combination with the medium gray ink. Such printing enables smooth transitions in tone, substantially without visible grain. An example of light gray, medium gray, and black ink fluxes is described in "9-ink Printing Using Vivera Inks: Image Quality and Permanence on Photo and Visual Arts Media" by Kabalnov et al., published in IS&T NIP21: International Conference on Digital Printing Technologies, Vol. 21, 364-370 (Sept. 18, 2005).

Embodiment(s) of the inks included in the ink set disclosed herein exhibit substantial gloss uniformity when established on the substrate. The gloss uniformity is visible to the naked eye, and may be measured by a gloss-meter (e.g., manufactured by BYK-Gardner) at 20, 40, and 60 degrees.

As previously mentioned, one of the challenges for achieving gloss uniformity for the pigmented ink output on glossy media is the interference of the light reflected from the top of the ink dot (at the air interface) and from the bottom of the ink dot (at the media interface). If the thickness of the film is close to one quarter of the wavelength of the light, a constructive interference between the light beams occurs, which may result in an undesirable increase in gloss, followed by a rainbow color effect (bronzing) and a decrease in gloss. Without being bound to any theory, it is believed that In order to minimize this effect, the thickness of the ink film should be above the threshold value. It is further believed that this may be achieved by increasing the percentage of the carboxylic polymer in the light gray, light cyan, and/or light magenta inks to an amount ranging from about 3 wt % to about 5 wt %. It is further believed that an effective amount of carboxylic polymer (e.g., from about 1 wt % to about 3 wt %) in the medium gray ink contributes to minimization of light interference.

To further illustrate embodiment(s) of the present disclosure, an example is given herein. It is to be understood that this example is provided for illustrative purposes and is not to be construed as limiting the scope of the disclosed embodiment(s).

EXAMPLE

Four ink sets were prepared including light gray ink, medium gray ink, and black ink according to the embodiment(s) disclosed herein. Tables 1-4 provide the ink formulations for the light gray, medium gray, and black inks included in each of the ink sets (labeled Ink Sets 1, 2, 3 and 4). The pigments used for the inks of Ink Sets 1-4 included Pigment Blue 15:3, carbon black, and Pigment Violet 23. As depicted in the tables, the polymer loadings were in accordance with the embodiments disclosed herein. As shown in the Tables, the black ink for each ink set had the same formulation.

The four ink sets were tested against one comparative ink set sample (labeled Ink Set 5). The comparative ink set included a light gray ink, a medium gray ink, and a black ink having substantially similar pigment loadings as provided for Ink Sets 1-4. However, the polymer loading in the light and medium gray inks of the comparative ink set (Ink Set 50 was significantly lower than the polymer loadings in Ink Sets 1-4. The black ink formulation of Ink Set 5 was identical to those of Ink Sets 1-4. The ink vehicle of the inks in the comparative ink set was similar to that of the Ink Set 3, except for the polymer load was lower in Ink Set 5.

TABLE 1

Ink Set 1

| Ink Component | Light Gray Ink Conc. (wt %) | Medium Gray Ink Conc. (wt %) | Black Ink Conc. (wt %) |
|---|---|---|---|
| Cyan Pigment | 0.06 | 0.19 | 0.49 |
| Black Pigment | 0.21 | 0.66 | 2.09 |
| Violet Pigment | 0.04 | 0.13 | 0.41 |
| Carboxylic Polymer 1 | 2.00 | 2.00 | — |
| Carboxylic Polymer 2 | 0.18 | 0.18 | — |
| Carboxylic Polymer 3 | — | — | 0.80 |
| Carboxylic Polymer 4 | — | — | — |
| Carboxylic Polymer 5 | 0.09 | 0.29 | 0.90 |
| Glycerol polyoxyethyl ether (LEG-1) | — | — | 3.00 |
| Betaine | 10.00 | 10.00 | — |
| Diethylene Glycol | 0.31 | 0.98 | 3.00 |
| Glycerol | 10.00 | 10.00 | 5.00 |
| 2-Pyrrolidone | 2.00 | 2.00 | 6.00 |
| 1,2-Hexanediol | 4.00 | 4.00 | 4.00 |
| Triethanolamine | 0.80 | 0.80 | 0.40 |
| Surfactant(s) | 0.40 | 0.40 | 0.67 |
| Additive(s) | — | 0.01 | 0.15 |
| Total Amount of Polymers | 2.27 | 2.47 | 1.70 |
| Total Amount of Pigments | 0.31 | 0.98 | 2.99 |

TABLE 2

Ink Set 2

| Ink Component | Light Gray Ink Conc. (wt %) | Medium Gray Ink Conc. (wt %) | Black Ink Conc. (wt %) |
|---|---|---|---|
| Cyan Pigment | 0.06 | 0.19 | 0.49 |
| Black Pigment | 0.21 | 0.66 | 2.09 |
| Violet Pigment | 0.04 | 0.13 | 0.41 |
| Carboxylic Polymer 1 | 2.00 | 2.00 | — |
| Carboxylic Polymer 2 | 0.18 | 0.18 | — |
| Carboxylic Polymer 3 | — | — | 0.80 |
| Carboxylic Polymer 4 | 2.00 | 1.00 | — |
| Carboxylic Polymer 5 | 0.09 | 0.29 | 0.90 |
| Glycerol polyoxyethyl ether (LEG-1) | — | — | 3.00 |
| Betaine | 10.00 | 10.00 | — |
| Diethylene Glycol | 0.31 | 0.98 | 3.00 |
| Glycerol | 10.00 | 10.00 | 5.00 |
| 2-Pyrrolidone | 2.00 | 2.00 | 6.00 |

TABLE 2-continued

Ink Set 2

| Ink Component | Light Gray Ink Conc. (wt %) | Medium Gray Ink Conc. (wt %) | Black Ink Conc. (wt %) |
|---|---|---|---|
| 1,2-Hexanediol | 4.00 | 4.00 | 4.00 |
| Triethanolamine | 0.80 | 0.80 | 0.40 |
| Surfactant(s) | 0.40 | 0.40 | 0.67 |
| Additive(s) | — | 0.01 | 0.15 |
| Total Amount of Polymers | 4.27 | 3.47 | 1.70 |
| Total Amount of Pigments | 0.31 | 0.98 | 2.99 |

TABLE 3

Ink Set 3

| Ink Component | Light Gray Ink Conc. (wt %) | Medium Gray Ink Conc. (wt %) | Black Ink Conc. (wt %) |
|---|---|---|---|
| Cyan Pigment | 0.06 | 0.19 | 0.49 |
| Black Pigment | 0.21 | 0.66 | 2.09 |
| Violet Pigment | 0.04 | 0.13 | 0.41 |
| Carboxylic Polymer 1 | 2.00 | 2.00 | — |
| Carboxylic Polymer 2 | 0.18 | 0.18 | — |
| Carboxylic Polymer 3 | — | — | 0.80 |
| Carboxylic Polymer 4 | 2.00 | 1.00 | — |
| Carboxylic Polymer 5 | 0.09 | 0.29 | 0.90 |
| Glycerol polyoxyethyl ether (LEG-1) | — | — | 3.00 |
| Betaine | 10.00 | 10.00 | — |
| Diethylene Glycol | 0.31 | 0.98 | 3.00 |
| Glycerol | — | — | 5.00 |
| 2-Pyrrolidone | 12.00 | 12.00 | 6.00 |
| 1,2-Hexanediol | 4.00 | 4.00 | 4.00 |
| Triethanolamine | 0.80 | 0.80 | 0.40 |
| Surfactant(s) | 0.40 | 0.40 | 0.67 |
| Additive(s) | — | 0.01 | 0.15 |
| Total Amount of Polymers | 4.27 | 3.47 | 1.70 |
| Total Amount of Pigments | 0.31 | 0.98 | 2.99 |

TABLE 4

Ink Set 4

| Ink Component | Light Gray Ink Conc. (wt %) | Medium Gray Ink Conc. (wt %) | Black Ink Conc. (wt %) |
|---|---|---|---|
| Cyan Pigment | 0.06 | 0.19 | 0.49 |
| Black Pigment | 0.21 | 0.66 | 2.09 |
| Violet Pigment | 0.04 | 0.13 | 0.41 |
| Carboxylic Polymer 1 | 2.00 | 2.00 | — |
| Carboxylic Polymer 2 | 0.18 | 0.18 | — |
| Carboxylic Polymer 3 | — | — | 0.80 |
| Carboxylic Polymer 4 | 2.00 | 1.00 | — |
| Carboxylic Polymer 5 | 0.09 | 0.29 | 0.90 |
| Glycerol polyoxyethyl ether (LEG-1) | 3.00 | 3.00 | 3.00 |
| Betaine | — | — | — |
| Diethylene Glycol | 0.31 | 0.98 | 3.00 |
| Glycerol | 5.00 | 5.00 | 5.00 |
| 2-Pyrrolidone | 6.00 | 6.00 | 6.00 |
| 1,2-Hexanediol | 4.00 | 4.00 | 4.00 |
| Triethanolamine | 0.40 | 0.40 | 0.40 |
| Surfactant(s) | 0.37 | 0.37 | 0.67 |
| Additive(s) | 0.10 | 0.10 | 0.15 |
| Total Amount of Polymers | 4.27 | 3.47 | 1.70 |
| Total Amount of Pigments | 0.31 | 0.98 | 2.99 |

The light gray ink, the medium gray ink, and the black ink of Ink Sets 1-4 and of comparative Ink Set 5 were each printed on HP Premium Instant-dry Gloss Photo Paper using an HP Designjet Z3100 Photo Printer. No gloss enhancer was used in combination with the inks. The printing was accomplished through the printer driver, without any use of composite black (i.e., no color inks were used along with the gray inks to form a black and white image). The relative ink fluxes of light gray, medium gray and photo black inks were at the default settings of the Designjet Z3100 Photo Printer.

The performance of the four ink sets in Ink Sets 1-4 in terms of gloss uniformity was compared to the gloss uniformity achieved using comparative Ink Set 5. A sequence of 35 gradations of gray, from white to black, was printed on the substrate, and the gloss level was measured at 20 degrees a Micro-Haze-Plus Meter or a Micro-Tri-Gloss Meter, both of which are manufactured by BYK-Gardner, Geretsried, Germany. Table 5, provided below, provides the results of the gloss uniformity for Ink Sets 1-5, wherein the gloss uniformity is represented by an average of the measured gloss level reading of the inks established on the substrate, and the standard deviation for these 35 measurements.

TABLE 5

Gloss Uniformity Comparison Data

| Ink Set | Gloss Uniformity Level (average ± standard deviation) | Total Polymer Loading in Inks (light gray:medium gray:black) |
|---|---|---|
| 1 | 55 ± 16 | 2.27:2.47:1.7 |
| 2 | 42 ± 10 | 4.27:3.47:1.7 |
| 3 | 55 ± 10 | 4.27:3.47:1.7 |
| 4 | 49 ± 12 | 4.27:3.47:1.7 |
| 5 | 77 ± 37 | 0.7:0.8:1.7 |

As shown in Table 5, Ink Sets 1-4 each had a standard deviation that is substantially smaller than the standard deviation of Ink Set 5 (the comparative test sample), both in absolute and relative terms. This demonstrates that Ink Sets 1-4 have superior gloss uniformity than the comparative test samples. Ink Sets 2, 3 and 4 (i.e., the ink set samples having the higher polymer loading for the light and medium gray inks) demonstrated even superior gloss uniformity than Ink Set 1, which had smaller polymer loading in the light and medium gray ink formulations. Thus, it is believed that the presence of higher loadings of carboxylic polymers in the light and medium gray pigmented ink formulations improves gloss uniformity of the inks when established on the photo-paper, without the use of a gloss enhancer.

While several embodiments have been described in detail, it will be apparent to those skilled in the art that the disclosed embodiments may be modified. Therefore, the foregoing description is to be considered exemplary rather than limiting.

What is claimed is:

1. An ink set, comprising:
a light gray ink having a carboxylic polymer load equal to or greater than about 4.27 wt %;
a medium gray ink having a carboxylic polymer load ranging from about 2.47 wt % to about 3.47 wt %; and
a black ink having a carboxylic polymer load ranging from about 0.5 wt % to about 2 wt;
wherein a different load of the carboxylic polymer is present in each of the inks so that the light gray ink has a higher carboxylic polymer load than the medium gray ink, and the medium gray ink has a higher carboxylic polymer load than the black ink.

2. The ink set as defined in claim 1 wherein when established on a substrate, the light gray ink exhibits a gloss level less than a gloss level exhibited by the medium gray ink, and wherein gloss is measured at a maximum gloss point.

3. The ink set as defined in claim 1 wherein when established on a substrate, the medium gray ink exhibits a gloss level less than a gloss level exhibited by the black ink, and wherein gloss is measured at a maximum gloss point.

4. The ink set as defined in claim 1 wherein each of the inks exhibits substantial gloss uniformity, decreased bronzing, or combinations thereof when established on a substrate.

5. The ink set as defined in claim 1 wherein a ratio of colorant load in the medium gray ink to colorant load in the light gray ink ranges from about 1.5:1 to about 4:1.

6. The ink set as defined in claim 1 wherein a ratio of colorant load in the black ink to colorant load in the medium gray ink ranges from about 2:1 to about 4:1.

7. The ink set as defined in claim 1 wherein the carboxylic polymers are selected from styrene-acrylic polymers, hydrolyzed co-polymers of styrene and maleic acid anhydride, and combinations thereof.

8. The ink set as defined in claim 1 wherein the carboxylic polymers have a molecular weight ranging from about 1000 to about 20,000, and an acid number ranging from about 50 to about 200.

9. The ink set as defined in claim 1 wherein each of the light gray ink and the medium gray ink includes one of the following groups:
cyan pigment, black pigment, and violet pigment;
cyan pigment, black pigment, and magenta pigment;
black pigment and cyan pigment;
black pigment and blue pigment; or
black pigment.

10. The ink set as defined in claim 1 wherein each of the light gray ink, the medium gray ink and the black ink has an ink vehicle including:
at least one solvent;
at least one surfactant; and
water.

11. The ink set as defined in claim 1 wherein the carboxylic polymer load of the light gray ink is about 4.27 wt %, wherein the carboxylic polymer load of the medium gray ink is about 3.47 wt %, and wherein the carboxylic polymer load of the black ink is about 1.7 wt %.

12. A method for forming an image having substantial gloss uniformity using the ink set as defined in claim 1, the method comprising:
operatively disposing the ink set in a printer; and
establishing the light gray ink, the medium gray ink, the black ink or combinations thereof on at least a portion of a substrate.

13. The method as defined in claim 12 wherein establishing is accomplished by thermal inkjet printing, piezoelectric inkjet printing, or continuous inkjet printing.

14. A method of making an ink set, comprising: forming a light gray ink, a medium gray ink, and a black ink, each of which includes an ink vehicle and at least one pigment; and
adding a different amount of a carboxylic polymer to each of the ink vehicles so that the light gray ink has a higher carboxylic polymer load than the medium gray ink, and the medium gray ink has a higher carboxylic polymer load than the black ink;
wherein adding the different amount of the carboxylic polymer to each of the ink vehicles includes:
adding, to the ink vehicle of the light gray ink, the carboxylic polymer in an amount equal to or greater than 4.27 wt %;
adding, to the ink vehicle of the medium gray ink, the carboxylic polymer in an amount ranging from about 2.47 wt % to about 3.47 wt %; and
adding, to the ink vehicle of black ink, the carboxylic polymer in an amount ranging from about 0.5 wt % to about 2 wt %.

15. The method as defined in claim 14, further comprising filling a respective ink cartridge with the light gray ink, the medium gray ink and the black ink.

16. The method as defined in claim 14 wherein when established on a substrate, the light gray ink exhibits a gloss level less than a gloss level exhibited by the medium gray ink, and wherein gloss is measured at a maximum gloss point.

17. The method as defined in claim 14 wherein when established on a substrate, the medium gray ink exhibits a gloss level less than a gloss level exhibited by the black ink, and wherein gloss is measured at a maximum gloss point.

18. The method as defined in claim 14 wherein a ratio of pigment load in the medium gray ink to pigment load in the light gray ink ranges from about 1.5:1 to about 4:1.

19. The method as defined in claim 14 wherein a ratio of pigment load in the photo black ink to pigment load in the medium gray ink ranges from about 2:1 to about 4:1.

20. An ink set, comprising:
a light gray ink having a carboxylic polymer load equal to or greater than about 4.27 wt %;
a medium gray ink having a carboxylic polymer load ranging from about 2.47 wt % to about 3.47 wt %; and
a black ink having a carboxylic polymer load ranging from about 0.5 wt % to about 2 wt %;
wherein a different load of the carboxylic polymer is present in each of the inks so that the light gray ink has a higher carboxylic polymer load than the medium gray ink, and the medium gray ink has a higher carboxylic polymer load than the black ink;
wherein each of the light gray ink and medium gray ink includes cyan pigment, black pigment, and violet pigment.

* * * * *

UNITED STATES PATENT AND TRADEMARK OFFICE
CERTIFICATE OF CORRECTION

| | | |
|---|---|---|
| PATENT NO. | : 8,052,268 B2 | |
| APPLICATION NO. | : 11/689026 | |
| DATED | : November 8, 2011 | |
| INVENTOR(S) | : Alexey S. Kabalnov et al. | |

It is certified that error appears in the above-identified patent and that said Letters Patent is hereby corrected as shown below:

In column 11, line 13, in Claim 1, delete "2 wt;" and insert -- 2 wt %; --, therefor.

Signed and Sealed this
Twenty-fifth Day of September, 2012

David J. Kappos
*Director of the United States Patent and Trademark Office*